United States Patent [19]

Lemmon

[11] 3,981,216

[45] Sept. 21, 1976

[54] LOW NOISE, HIGH SPEED SAW BLADE

[75] Inventor: Kenneth R. Lemmon, Grand Rapids, Mich.

[73] Assignee: Lemmon & Snoap Co., Grand Rapids, Mich.

[22] Filed: Apr. 9, 1975

[21] Appl. No.: 566,263

Related U.S. Application Data

[63] Continuation-in-part of Ser. No. 367,432, June 6, 1973, abandoned.

[52] U.S. Cl. ................................... 83/848; 83/835
[51] Int. Cl.² ............................................ B27B 5/38
[58] Field of Search ................... 83/835, 846–855; 125/15

[56] References Cited
UNITED STATES PATENTS

| | | | |
|---|---|---|---|
| 245,090 | 8/1881 | Northway | 83/848 |
| 464,855 | 12/1891 | Clark | 83/835 |
| 1,723,843 | 8/1929 | Chapin | 83/835 |
| 3,363,617 | 1/1968 | Hoerer | 125/15 |

Primary Examiner—J. M. Meister
Attorney, Agent, or Firm—McGarry & Waters

[57] ABSTRACT

A high speed circular saw blade exhibiting low operating noise characteristics comprises a plurality of narrow expansion slots up to about 3/32 inches wide formed in the outer edge of the blade at a negative angle of about 5°–15° with respect to a line extending radially from the center of the blade to the slots. Two to five slots are provided in each blade, with the depth of each slot being between about ¾ to 2½ inches, depending on the diameter of the blade. Expansion holes are provided at the bottom of each slot, and a further reduction in noise level is achieved by plugging these holes with a resilient material such as solder or the like. With regularly spaced teeth the saw blade functions principally as a "cut-off" saw blade, but by removing every sixth tooth and placing the slots at the forward edges of the elongated spaces or deep gullets left by the missing teeth, the saw blade may be used as a combination cut-off and rip saw blade, with a substantial reduction in noise being achieved in both operations.

19 Claims, 3 Drawing Figures

U.S. Patent  Sept. 21, 1976  3,981,216
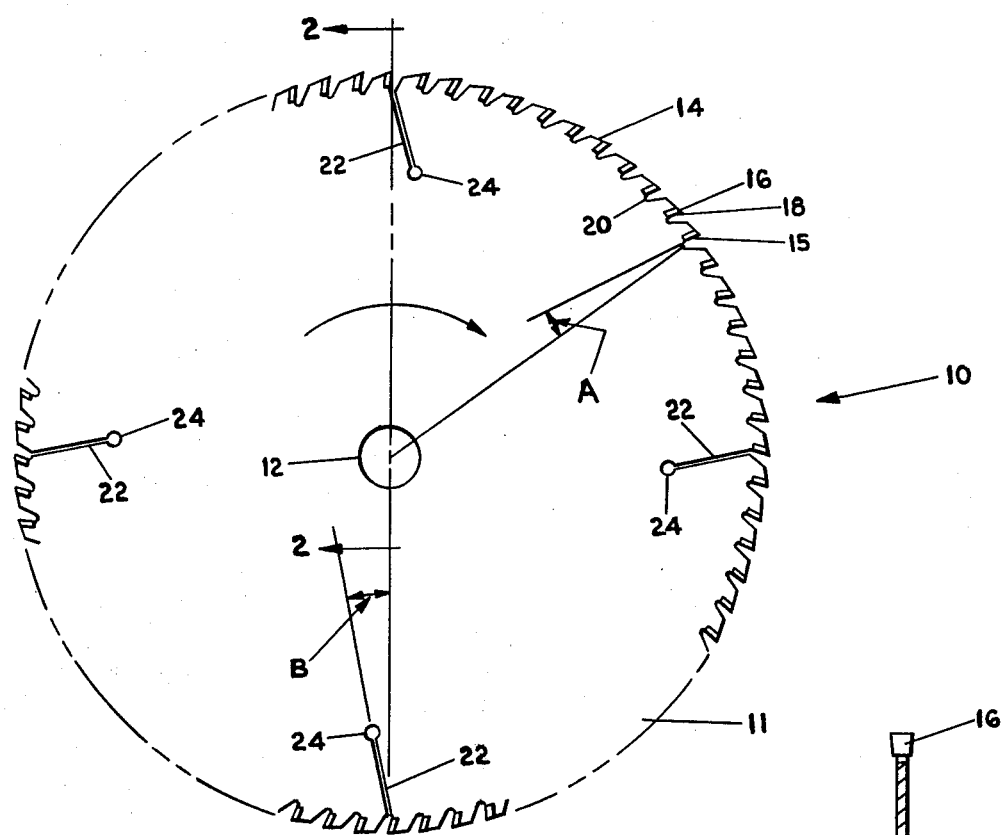
FIG. 1
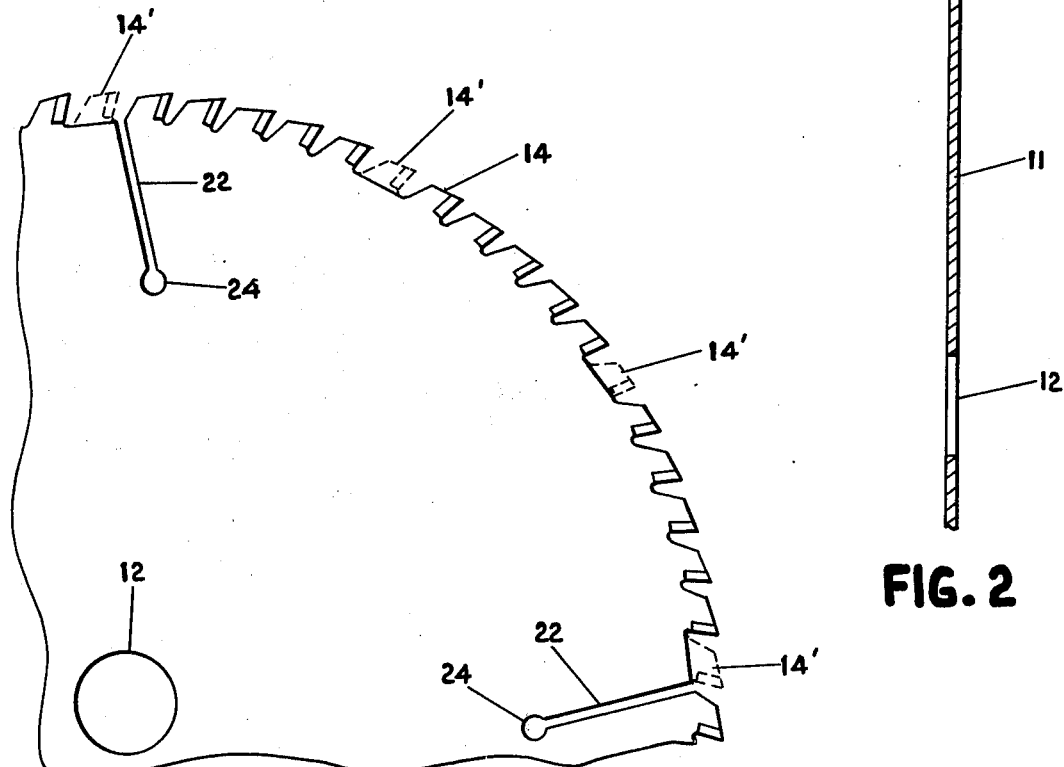
FIG. 2
FIG. 3

LOW NOISE, HIGH SPEED SAW BLADE

CROSS-REFERENCE TO RELATED APPLICATION

This application is a continuation-in-part of applicant's co-pending application Ser. No. 367,432, filed June 6, 1973, now abandoned.

BACKGROUND OF THE INVENTION

1. Field of the Invention

This invention relates generally to circular saw blades and more particularly to a low noise, high speed circular saw blade.

2. Description of the Prior Art

There are several types and designs of saw blades for cutting different types of material. These saw blades have in common a plurality of teeth spaced about the outer periphery of the blade, with the teeth being provided with suitable cutting edges. Usually, most saw blades also include a plurality of expansion slots in the outer edges of the saw blades in order to prevent heat warpage of the blades.

An expansion slot may be formed in one of three directions. It may be formed in a radial direction (i.e., directly aligned with the center of the blade); it may be formed at a so-called "positive" angle; or it may be formed at a "negative" angle. A positive angle is an angle such that the bottom of the slot trails a line extending from the center of the blade to the outer edge of the slot, relative to the direction of rotation of the saw blade. In contrast with a positive angle, the bottom of a negative angle slot leads the radial line in the direction of rotation of the saw blade. The angle of an expansion slot is sometimes referred to as the "hook" of the slot, with a radial slot having a 0° hook, and positive and negative angle slots having positive and negative hooks, respectively.

Different types of saw blades and different types of expansion slots are provided for cutting different types of material. One type of saw blade is commonly referred to as a "green wood" saw blade. This is a large diameter saw blade (i.e., from 30 to 100 inches in diameter) and is employed for cutting raw lumber in lumber mills. Because of the large size of these saw blades, green wood saw blades generally are operated at relatively slow rotation speeds of about 500–1200 revolutions per minute (r.p.m.), although some green wood saw blades can be rotated at speeds of up to 3600 r.p.m.. The risk with higher rotation speeds is that the blade can fly apart.

One problem associated with a green wood saw blade is that the cut wood tends to "grow back" or swell up against the blade, and fresh, moist sawdust produced by the cutting action binds in the space between the face of the saw blade and the wood being cut. This causes excessive friction between the blade and the wood, and this can damage the blade. In order to avoid this problem, "green wood" saw blades are provided with wide (i.e., at least ¼ – ½ inch) and deep (i.e., at least ¼ of the diameter of the blade) expansion slots formed at a negative angle up to 40°, with the expansion slots being provided with wide cutting edges or inserts along the trailing edges of the slots. As these saw blades rotate and the sawdust enters the space between the saw teeth and the face of the saw blade, the sawdust comes in contact with the angled cutting edges on the expansion slots and is propelled by centrifugal force along the cutting edges out of the area between the saw blade and the wood cut.

One of the side effects of employing inserts in the expansion slot of a saw blade is that they tend to permit the blade to flop back and forth. This makes such blades undesirable in cutting dry woods. A drawback with employing wide slots is that blades having wide slots cannot be used safely for dry woods. One reason for this is that when dry woods are cut, hard splinters and chips are produced, and these can become wedged into a wide slot in a blade. When this occurs, the splinter or chip wedged in the expansion slot causes the rapidly rotating saw blade to catch the piece of wood and impart a strong force to the wood. This can cause the wood to fly off the cutting table with substantial velocity, which is dangerous. Wet woods do not produce the same types of splinters and chips, so this risk is not present with wet woods. The use of narrow expansion slots in dry wood saw blades substantially eliminates the risk of chips and splinters getting caught in the expansion slots. Because of the foregoing considerations, blades with wide slots and inserts along the slots typically are used exclusively for green woods and generally are rotated at slower speeds. Such blades are used almost exclusively for cutting raw lumber in lumber mills.

Most circular saws employed for cutting lumber after it has been pre-cut into useable sizes in a lumber mill are called "high speed" saws. These saws operate at rotation speeds of about 1700 to 7200 r.p.m., with the most common rotation speed being about 3450–3600 r.p.m. These saws are used in almost all wood cutting operations and are also used for cutting plastics, chipboard, and hardboard, and other similar material. High speed saw blades may have a diameter up to 30 inches but generally the diameter is 20 inches or less. The rotation speeds permissable with such saw blades are inversely proportional to the diameter of the blade. Thus, it is possible to run a 30 inch high speed saw blade at speeds up to about 1725 r.p.m., while a 20 inch high speed saw blade may be operated safely at 3450 r.p.m. and a 14 inch blade may be operated safely at 5000 r.p.m.

Two types of high speed saw blades that are of particular interest in the context of the present invention are known as "cut-off" or "cross cut" saw blades and "rip" saw blades. "Rip" saw blades are designed for cutting lumber along the longitudinal direction or with the grain of the lumber, and when several of these saws are attached together in parallel, the saws are referred to as "ganged" rip saws.

"Cut-off" saw blades are designed for cutting across the grain of the wood.

High speed saw blades, like low speed saw blades, employ expansion slots to prevent blade warpage due to heat buildup in the blade. However, sawdust buildup adjacent the face of the blade is not a problem with high speed saw blades (which generally are employed for cutting dry wood or other such materials), so no special design criteria is necessary for expansion slots in high speed saw blades. Typically, such slots are usually about one inch deep for a 12–30 inch blade and about ¾ inch for a 6–12 inch blade and are formed at the same positive hook as the teeth of the blade (which may be between +10° and +30°). Occasionally, the expansion slots are formed in a radial direction or at a 0° hook. One of the problems encountered with high speed saw blades is that operation noise levels are practically intolerable to the human ear. The noise of such saws rotating freely may be in excess of 100 decibels when freely rotating and as high as 110–115 decibels during the cutting operation, depending on the type and thickness of the material being cut. Federal authorities have specified a 90 decibel ceiling for such saws, and the saws presently in use are incapable of satisfying this criteria. With conventional dry wood cutting saws, the noise problem becomes significant at speed in excess of 2600 r.p.m.

The present invention provides an improved circular saw blade, wherein operation noise levels of the saw are reduced to acceptable levels.

SUMMARY OF THE INVENTION

In accordance with the present invention, a high speed circular saw blade having low noise operating characteristics comprises a plurality of narrow expansion slots up to about 3/32 inches wide formed in the outer edge of the blade at a negative angle of about 5°–15° with respect to a line extending radially from the center of the blade to the slot. Preferably, the slots extend into the blade a distance at least 1/16 – 1/8 of the diameter of the blade depending upon the size of the blade. An expansion hole is provided at the bottom of each slot to prevent cracks in the blade, and further noise reduction is produced by plugging the expansion holes with a resilient material such as solder or the like.

With the saw blade of the present invention, previously intolerable noise levels present in connection with the operation of high speed saws are reduced to acceptable and tolerable levels as low as 85 decibels in certain cases.

To employ the saw blade of the present invention as a combination cut-off and rip saw blade, every sixth tooth on the saw blade is removed, leaving a long open space or deep gullet between every set of five spaced teeth. The negative angle slots are inserted at the forward edges of the deep gullets. A saw blade formed in this manner will serve well as both a cut-off and rip saw and will provide noise reduction advantages in both operations.

These and other advantages and features of the present invention will hereinafter appear and for purposes of illustration but not of limitation, preferred embodiments of the subject invention are described below.

BRIEF DESCRIPTION OF THE DRAWINGS

FIG. 1 is a face elevational view of the saw blade of the present invention.

FIG. 2 is a cross-sectional view taken along line 2—2 of FIG. 1.

FIG. 3 is a face elevational view of a second embodiment of the present invention.

DETAILED DESCRIPTION OF THE PREFERRED EMBODIMENTS

Referring now to the drawings, a rotary saw blade 10 embodying the principles of the present invention is shown in FIG. 1. Saw blade 10 includes a disc-like saw blade or plate 11 having a central opening 12 and a plurality of saw teeth 14 circumferentially positioned around the periphery of plate 11. Each tooth 14 has a leading edge 15 relative to the direction of rotation of the blade (which is clockwise according to FIG. 1 orientation), and each leading edge is faced or tipped with a cutting element 16 formed of a hard metal, such as tungsten carbide or the like. Elements 16 are fastened to the leading edges of the saw teeth by welding or brazing.

As shown in FIG. 2, the width of each cutting element 16 is greater than the width of the saw blade itself, with the width of the cutting elements determining the width or kerf of the cut of the saw. Each cutting element 16 comprises a cutting edge 18, which preferably is formed at a positive angle or hook A of about 15° relative to a radial line extending from the center of the blade to the cutting edge of the blade. This angle is variable, depending upon the application to which the saw is to be used.

Saw teeth 14 are spaced evenly about the outer perimeter of the saw blade and are separated by a series of gullets 20, which are rounded surfaces between the teeth on the saw blade. Gullets 20 extend slightly below the lower portion of cutting elements 16.

In accordance with the present invention, saw blade 10 is provided with a plurality of expansion slots 22 (preferably 2 to 5) that extend inwardly from the outer perimeter of the saw blade. As shown in FIG. 1, each expansion slot 22 extends from the bottom of a gullet 20 at a negative angle B with respect to a line extending radially from the center of the blade to the outer opening of the expansion slot. Expansion slots 22 are each provided with an expansion hole 24 at the bottom thereof, in order to obviate stresses which can produce cracks in the saw blade at the base of the slot. Typically, expansion holes 24 are approximately 3/16 inches in diameter, but the dimensions are not critical.

One of the principal features of the present invention is the negative angle or hook B at which the expansion slots are formed. In accordance with the present invention, substantial reductions in operating noise characteristics are achieved by forming the expansion slots at a negative angle B of about 5°–15°. Preferably, the negative angle is about 8°–12° and ideally the angle is 10°–12°. A workable angle that provides a substantial reduction in noise is 5°–10°. Negative angles less than 5° produce only minor reductions in noise level, and negative angles greater than 20° produce no significant reductions in noise level. Similarly positive angles produce no reduction in operating noise level.

As the negative angle is increased from 0° to 20°, no discernible reduction in noise level is noticed until the angle reaches about 5° negative. From this point until the angle is about 8° negative, the reduction in noise level is gradual. At 8° and greater the noise level begins to drop off markedly, and there is a substantial peak reduction in noise level produced in a critical angle range of 10°–12° negative. As the negative angle is further increased the reduction becomes less significant until an angle of 15° negative is reached, at which point there is little discernible reduction over a 0° hook. Further increase of the negative angle produces no reduction in noise levels.

With regard to the other dimensions of the slots of the present invention, the depth of the slots has been found to have an effect on noise reduction. For example, in experiments with a 16 inch blade, reductions in noise level were first noticed at a slot depth of about one inch. This effect became more pronounced at 1¼ inches, and there was a further appreciable improvement at 1½ – 1¾ inches. With most materials, no further noticeable improvement in noise reduction properties is achieved as the slot depth is further increased to 2 – 2½ inches, but tests with the blades suggest a relationship between effective slot depth and the thickness of the material being cut, with the effective slot depth being a depth at least as thick as the material being cut.

In the preferred practice of the present invention, a ¾–1 inch slot is employed for 6–12 inch blades; a 1 – 1½ inch slot is employed for 12–16 inches blades; a 1½ – 1¾ inch slot is employed for a 16–20 inch diameter blade; and a 2 – 2½ inch slot is employed for larger blades up to 30 inches in diameter.

As to the width of the slots, no minimum slot width has been found to be necessary to produce an appreciable effect on noise reduction. Accordingly, normal slot widths of 1/32–1/16 inch are employed. It is difficult to cut a slot much narrower than 1/32 inch (eg., 1/64 inch) with conventional tools, so such widths are not normally employed. Slots somewhat larger than 1/16 inch could be employed, particularly in larger blades, without adversely affecting noise reduction properties, but it has been found that when slot width is increased to more than about 3/32 inch, the low noise characteristics of the blade are lost or at least substantially reduced. Accordingly, a maximum slot width of about 3/32 inch is believed to be necessary for good performance of the blade, and the preferred range is about 1/32–1/16 inch.

Another feature of the present invention is that substantial additional reduction in noise level is achieved by plugging the expansion holes at the ends of the slots with a suitable resilient material, such as solder or the like. Experimental evaluations indicate that this further reduces the noise level produced by high speed cutting blades as much as 3–8 decibels, while not adversely affecting the strain resisting properties of the expansion holes.

The saw blade of the present invention is particularly useful as a high speed cut-off saw blade. However, this saw blade may be employed in modified form as a combination cut-off saw and rip saw. In order to modify the blade shown in FIG. 1 to form a combination cut-off and rip saw blade, every sixth tooth 14' is removed, leaving an elongated space or deep gullet 26 between each group of five evenly spaced teeth. The expansion slots of the combination blade are formed at the leading or forward edges 28 of the deep gullets 26 relative to the direction of rotation of the blade. These expansion slots are formed in the same manner as the expansion slots discussed above for the FIG. 1 saw blade. Substantial reductions in noise level are achieved with the combination blade shown in FIG. 3, as well as the blade shown in FIG. 1.

EXPERIMENTAL EVALUATION

The following are a summary of the results of a test performed on a 16 inch diameter blade having 1½ inch deep expansion slots about 1/32–1/16 inch wide. Expansion holes were provided at the base of each expansion slot, and the expansion holes were plugged with solder. The saw blade comprised 100 carbide tipped teeth having a hook of +15°. The blade was rotated at 3450 r.p.m. by a direct drive motor and was tested for noise leval conditions while freely rotating and while engaged in cutting different types of wood.

| Expansion Slot Angle | Noise Level (Decibels) | |
|---|---|---|
| | Freely Rotating | Cutting |
| −20 degrees | 100 | 105–110 |
| −15 degrees | 95 | 105–110 |
| −10–12 degrees | 85–87 | 90–93 |
| −5 degrees | 95 | 105–110 |
| 0 degrees | 96–100 | 105–110 |
| +10 degrees | 100 | 105–110 |

As the above table indicates, only a slight improvement in noise performance is achieved within the range of 0° to 5° negative, but a substantial reduction of noise level occurs in the area between 5°–15° negative. With further pitch of the angle up to 20° negative, the noise reduction benefits are entirely lost. Similarly, there appears to be no reduction of noise level with the use of a 10° positive expansion angle.

It should be noted that the increase in noise level during cutting is dependant on the thickness and type of material being cut. The above cutting figures are within a range that might be achieved in cutting a 2×8 inch pine board or one inch plywood. With other materials the cutting noise levels may be as low as 88 decibels with the preferred blade of the present invention.

Usually, the increase in cutting noise level is greater for blades having higher freely rotating noise levels. Thus, the increase in cutting noise level of a blade with expansion slots having a 0° hook may be 10–15 decibels, whereas the increase may be only 5–8 decibels when a 10°–12° negative hook is used.

It should be understood that the embodiments described herein are merely exemplary of the preferred practices of the present invention and that various changes, modifications, and variations may be made in the arrangements, operations, and details of construction of the elements disclosed herein without departing from the spirit and scope of the present invention.

The embodiments of the invention in which an exclusive property of privilege is claimed are defined as follows:

1. In a high speed circular saw blade comprising a plurality of teeth spaced about the outer periphery of the blade, an improvement comprising a plurality of expansion slots formed in the outer edge of the blade at a negative angle of about 5°–15° with respect to lines extending radially from the center of the blade to the outer ends of the expansion slots, said expansion slots being greater than 0 inches and up to about three-thirty seconds (3/32) inches wide.

2. An improvement as claimed in claim 1 wherein the saw blade is 30 inches or less in diameter and is designed for operation at speeds in excess of 1700 r.p.m.

3. An improvement as claimed in claim 2 wherein each slot is formed at a negative angle of 8°–12° with respect to a line extending radially from the center of the blade to the outer end of the expansion slot.

4. An improvement as claimed in claim 2 wherein each slot is formed at a negative angle of 10°–12° with respect to a line extending radially from the center of the blade to the outer end of the expansion slot.

5. An improvement as claimed in claim 2 wherein each slot is formed at a negative angle of 5°–10° with respect to a line extending radially from the center of the blade to the outer end of the expansion slot.

6. An improvement as claimed in claim 1 wherein the depth of the slot is at least 1/16 of the diameter of the blade.

7. An improvement as claimed in claim 6 wherein the saw blade is 16-20 inches in diameter and the slots are at least 1½ - 1¾ inches deep.

8. An improvement as claimed in claim 6 wherein the saw blade is 6-12 inches in diameter and the slots are at least ¾ - 1 inches deep.

9. An improvement as claimed in claim 6 wherein the saw blade is 12-16 inches in diameter and the slots are at least 1 - 1½ inches deep.

10. An improvement as claimed in claim 6 wherein the saw blade is 20-30 inches in diameter and the slots are at least 2 - 2½ inches deep.

11. An improvement as claimed in claim 1 wherein every sixth tooth in the saw blade is removed, leaving a deep gullet between every set of five teeth, and the slots are formed at the forward edges of the deep gullets relative to the direction of rotation of the saw blade, whereby, the saw blade may serve as a combination cut-off and rip saw blade.

12. An improvement as claimed in claim 1 and further comprising expansion holes at the bottom of each expansion slot, with each expansion hole being plugged with a resilient material.

13. An improvement as claimed in claim 12 wherein the resilient material is solder.

14. An improvement as claimed in claim 13 wherein the expansion holes are about 3/16 inch in diameter.

15. An improvement as claimed in claim 1 wherein the expansion slots are about one-thirty second (1/32) to one-sixteenth (1/16) inches wide.

16. An improvement as claimed in claim 15 wherein the expansion slots are formed at a negative angle of 10°-12° with respect to a line extending radially from the center of the blade to the outer end of the expansion slot.

17. In a high speed saw blade designed for operation at rotation speeds in excess of 2600 r.p.m. comprising a plurality of teeth spaced about the periphery of the blade, an improvement comprising:
two to five expansion slots formed in the outer edge of the blade at negative angles of 5°-15° with respect to lines extending radially from the center of the blade to the outer ends of the slots, each slot having a depth of about 1/8 - 1/16 of the diameter of the blade and each slot having a width of up to about 3/32 inches; and
an expansion hole at the bottom of each expansion slot, each expansion hole being plugged with solder.

18. An improvement as claimed in claim 17 wherein the slots are at least as deep as the material being cut.

19. In a saw blade comprising a plurality of carbide tipped teeth spaced about the periphery of the blade, an improvement comprising a plurality of expansion slots formed in the outer periphery of the blade, each expansion slot being formed at a negative angle of about 10°-12°, the width of each slot being greater than zero and up to about 3/32 inches, and the length of each slot being at least about 1/16 to 1/8 of the diameter of the blade, each expansion slot having an expansion hole formed at the bottom thereof, with the expansion hole being plugged with a resilient material.

* * * * *